United States Patent
Alexander et al.

(10) Patent No.: US 9,928,075 B2
(45) Date of Patent: *Mar. 27, 2018

(54) LOAD QUEUE ENTRY REUSE FOR OPERAND STORE COMPARE HISTORY TABLE UPDATE

(71) Applicant: International Business Machines Corporation, Armonk, NY (US)

(72) Inventors: Khary J. Alexander, Poughkeepsie, NY (US); Ilya Granovsky, Kiryat Tivon (IL)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 429 days.

This patent is subject to a terminal disclaimer.

(21) Appl. No.: 14/621,579

(22) Filed: Feb. 13, 2015

(65) Prior Publication Data

US 2016/0239307 A1 Aug. 18, 2016

(51) Int. Cl.
*G06F 9/38* (2006.01)
*G06F 9/30* (2018.01)

(52) U.S. Cl.
CPC ........ *G06F 9/3871* (2013.01); *G06F 9/30043* (2013.01); *G06F 9/3824* (2013.01); *G06F 9/3834* (2013.01); *G06F 9/3838* (2013.01); *G06F 9/3861* (2013.01)

(58) Field of Classification Search
None
See application file for complete search history.

(56) References Cited

U.S. PATENT DOCUMENTS

| 6,108,770 | A  | 8/2000  | Chrysos et al. |
| 6,463,523 | B1 | 10/2002 | Kessler et al. |
| 6,622,237 | B1 | 9/2003  | Keller et al.  |
| 7,657,726 | B2 | 2/2010  | Emma et al.    |

(Continued)

OTHER PUBLICATIONS

Khary J. Alexander, et al., Pending U.S. Appl. No. 15/080,848 entitled "Load Queue Entry Reuse for Operand Store Compare History Table Update" filed with the U.S. Patent and Trademark Office filed Mar. 25, 2016.

(Continued)

*Primary Examiner* — John Lindlof
(74) *Attorney, Agent, or Firm* — Cantor Colburn LLP; William A. Kinnaman, Jr.

(57) ABSTRACT

Embodiments relate to load queue entry reuse for operand store compare (OSC) history table update. An aspect includes allocating a load queue entry in a load queue to a load instruction that is issued into an instruction pipeline, the load queue entry comprising a valid tag that is set and a keep tag that is unset. Another aspect includes based on the flushing of the load instruction, unsetting the valid tag and setting the keep tag. Another aspect includes reissuing the load instruction into the instruction pipeline. Another aspect includes based on determining that the allocated load queue entry corresponds to the reissued load instruction, setting the valid tag and leaving the keep tag set. Another aspect includes based on completing the reissued load instruction, and based on the valid tag and the keep tag being set, updating the OSC history table corresponding to the load instruction.

20 Claims, 4 Drawing Sheets

(56) References Cited

U.S. PATENT DOCUMENTS

| | | |
|---|---|---|
| 8,015,362 B2 | 9/2011 | Alexander et al. |
| 8,447,911 B2 | 5/2013 | Burger et al. |
| 8,627,047 B2 | 1/2014 | Tsai et al. |
| 9,229,745 B2 | 1/2016 | Indukuru et al. |
| 9,361,113 B2 | 6/2016 | Ogasawara |
| 9,495,167 B2 | 11/2016 | Alexander et al. |
| 2003/0005266 A1* | 1/2003 | Akkary ............... G06F 9/30072 712/220 |
| 2010/0077181 A1* | 3/2010 | Abernathy ............ G06F 9/3824 712/214 |
| 2013/0318330 A1 | 11/2013 | Alexander et al. |
| 2013/0339670 A1 | 12/2013 | Busaba et al. |
| 2014/0108862 A1* | 4/2014 | Rafacz .................. G06F 9/3826 714/15 |

OTHER PUBLICATIONS

List of IBM Patents or Patent Applications Treated as Related (Appendix P), Filed Feb. 13, 2015, 2 pages.

Khary J. Alexnder, et al., Pending U.S. Appl. No. 14/621,579 entitled "Load Queue Entry Reuse for Operand Store Compare History Table Update" filed with the U.S. Patent and Trademark Office filed Feb. 13, 2015.

Khary J. Alexnder, et al., Pending U.S. Appl. No. 15/252,325 entitled "Load Queue Entry Reuse for Operand Store Compare History Table Update" filed with the U.S. Patent and Trademark Office filed Aug. 31, 2016.

List of IBM Patents or Patent Applications Treated As Related (Appendix P), Filed Dec. 28, 2016, 2 pages.

Moshovos, A., et al., "Dynamic Speculation and Synchronization of Data Dependences," ISCA '97, Denver, CO, USA; pp. 181-193.

* cited by examiner

LOAD QUEUE ENTRY REUSE FOR OPERAND STORE COMPARE HISTORY TABLE UPDATE

BACKGROUND

The present invention relates generally to operand store compare (OSC) operations in a computer processor, and more specifically, to load queue entry reuse for OSC history table update.

Out-of-order execution of instructions in a processor allows performance improvements by improving execution pipeline resource utilization. However, out-of-order execution may cause data conflicts in load and store instructions. The process of examining store and load instructions to identify potential data conflicts is referred to as operand store compare (OSC). Two examples of data conflicts that may be detected by OSC are store-hit-load, in which a younger load instruction is executed out-of-order ahead of older store instruction to the same storage location, so that the younger load fetches stale data; and load-hit-store, in which a load instruction is issued in order after a store instruction to the same storage location, but because the store instruction may take longer to complete than the load instruction, the store data is not written back to the storage location before the load is executed and the store data is therefore not available for the load.

When a store-hit-load event occurs, the execution of the load instruction that triggered the store-hit-load, and any other instructions that are chronologically younger than the load instruction, need to be rolled back and repeated with the correct store data. This process, referred to as a flush, carries considerable penalties, since execution of multiple instructions needs to be repeated by the processor. When a load-hit-store event occurs, the load instruction needs to be repeated at a later time after the store data is available for the load, e.g., after the store data has been written back into the storage location. The penalty for a load-hit-store event is not as high as with store-hit-load event, but the load that triggered the load-hit-store event may need to be repeated multiple times before the store data becomes available, taking over execution slots that could be utilized for other instructions.

SUMMARY

Embodiments include a method, system, and computer program product for load queue entry reuse for operand store compare (OSC) history table update. An aspect includes allocating a load queue entry in a load queue to a load instruction that is issued into an instruction pipeline of a processor, the load queue entry comprising a valid tag and a keep tag, wherein the valid tag is set and the keep tag is unset in the allocated load queue entry. Another aspect includes flushing the load instruction by the instruction pipeline. Another aspect includes based on the flushing of the load instruction, unsetting the valid tag and setting the keep tag in the allocated load queue entry. Another aspect includes reissuing the load instruction into the instruction pipeline. Another aspect includes determining that the allocated load queue entry corresponds to the reissued load instruction. Another aspect includes based on determining that the allocated load queue entry corresponds to the reissued load instruction, setting the valid tag and leaving the keep tag set in the allocated load queue entry. Another aspect includes completing the reissued load instruction in the instruction pipeline. Another aspect includes based on completing the reissued load instruction, and based on the valid tag and the keep tag being set, updating the OSC history table with OSC information corresponding to the load instruction.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
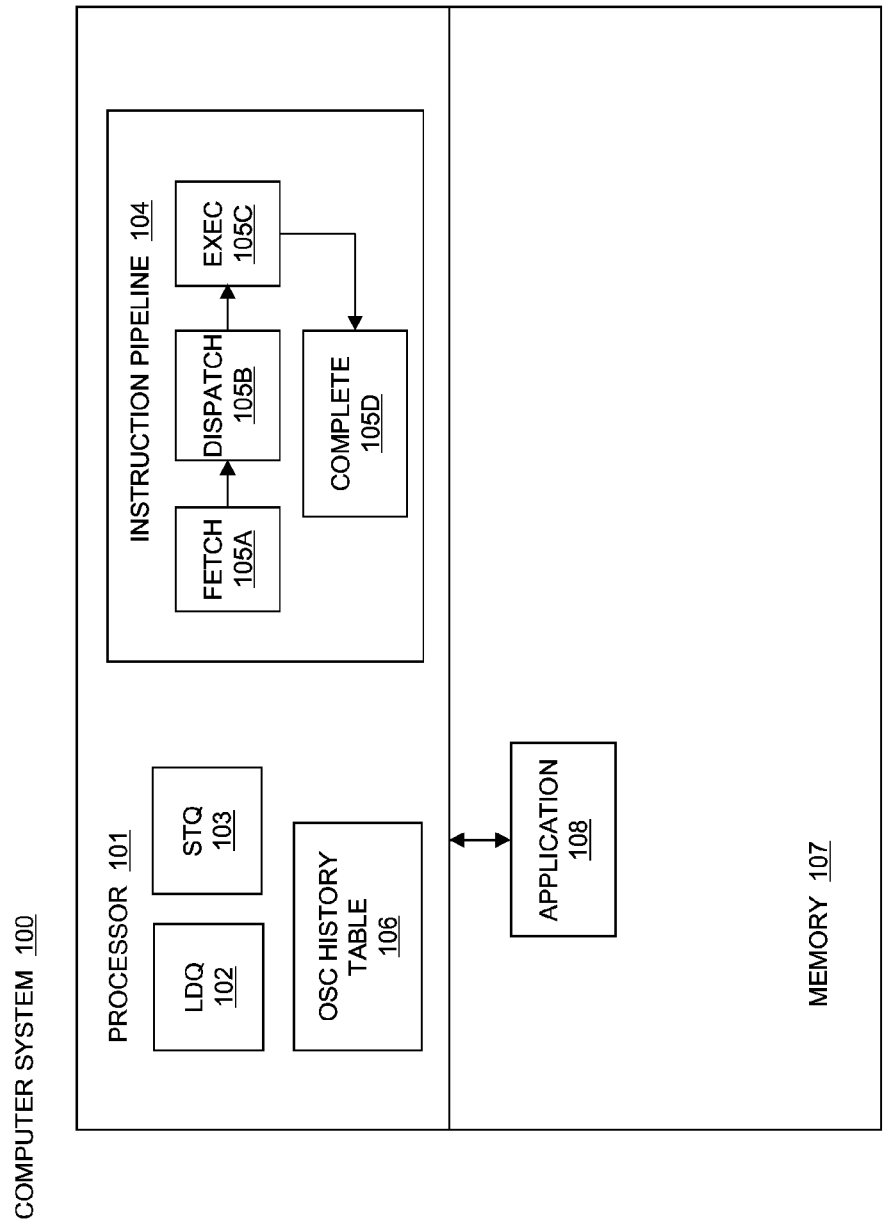
FIG. 1 depicts a computer system for load queue entry reuse for OSC history table update in accordance with an embodiment.

Embodiments of load queue entry reuse for OSC history table update are provided, with exemplary embodiments being discussed below in detail. A processor may maintain a table of instruction OSC history for instructions that incur OSC conflicts. The OSC history table stores entries for such instructions based on, for example, the instruction address of each instruction. The OSC history table is updated for a particular instruction that incurred an OSC conflict upon completion of the instruction. The OSC history table is used to estimate OSC conflict potential and enforce in-order execution of instructions that are likely to result in OSC conflicts on the first pass, so as to avoid OSC-related penalties. However, an instruction's information may not be preserved between repeated execution attempts of the instruction, particularly through the flush/roll-back process, making accurate OSC history table updates difficult. Inaccuracies in the OSC history table may cause instructions that are prone to OSC conflicts to not be marked as such, resulting in execution penalties, while instructions that are not likely to cause OSC conflicts may be falsely identified and forced to execute in order unnecessarily. Therefore, a dynamically allocated load queue is implemented to track instruction OSC data. Entries in the load queue are maintained through the flush/rollback process. An entry corresponding to an instruction that was flushed due to an OSC conflict is therefore preserved at flush and can be reused for the retry of the load instruction. When the retried instruction is completed, the OSC history table is updated, preserving the OSC information. Embodiments of load queue entry reuse for OSC update may be implemented in a simultaneous multithreaded (SMT) processor architecture. Updating of the OSC history table is discussed in further detail in U.S. Patent Publication No. 2013/0318330 (U.S. application Ser. No. 13/953,303, Alexander et al., filed Jul. 29, 2013), assigned to International Business Machines Corporation, which is herein incorporated by reference in its entirety.

In order to track repeated load instructions and accurately forward OSC history table updates at instruction completion time, each load queue entry has a valid tag and a keep tag, in addition to an instruction identifier (instruction ID), which may be the instruction tag (ITag) of the load instruction corresponding to the entry. An ITag is one of a set of reusable tags that are assigned to instructions as they proceed through the pipeline. The valid tag indicates whether the instruction is currently active in the processor pipeline. The valid tag is set when a new entry is allocated to an instruction and unset when the instruction is flushed due to an OSC conflict. When an instruction that matches an entry that is already in the load queue is issued, the valid tag is set again in the matching entry. The keep tag is set upon instruction flush, which occurs when an OSC conflict occurs for the instruction. The keep tag being set in a load queue entry maintains the entry through the instruction flush for reuse upon re-execution of the flushed instruction, and also indicates that the particular load queue entry requires an OSC history table update upon instruction completion because the instruction has been flushed. The instruction ID information in the entry is used to identify a repeat execution of an instruction. Whenever a new instruction is issued, if the instruction ID of the new instruction doesn't match any entry in the load queue, a new entry may be allocated for the new instruction and the instruction ID is stored in the entry.

In some cases, such as an instruction corresponding to a wrongly predicted branch, a flushed instruction is never repeated, and therefore the load queue entry corresponding to the flushed instruction should be discarded. Therefore, in some embodiments, when the load queue is full, an entry that has the keep tag set but the valid tag unset (i.e., a corresponding to a flushed instruction that has not been reissued) may be deallocated and reallocated to a new instruction. Further, if another instruction completes that is not a load instruction, but that has the same ITag as an entry in the load queue, the entry in the load queue corresponding to that ITag may be deallocated.

FIG. 1 illustrates an embodiment of a computer system 100 for load queue entry reuse for OSC history table update. Computer system 100 comprises a processor 101 in communication with a memory 107. The processor 101 includes a load queue (LDQ) 102, store queue (STQ) 103, an instruction pipeline 104, and an OSC history table 106. The instruction pipeline 104 includes a plurality of pipeline stages, including but not limited to fetch stage 105A, dispatch stage 105B, execution stage 105C, and completion stage 105D. Processor 101 executes applications, such as application 108 in memory 107, by processing instructions through the stages 105A-D of instruction pipeline 104. The load queue 102 tracks load instruction information for load instructions that have not successfully completed in the instruction pipeline 104. The store queue tracks store instruction information for store instructions that have not successfully completed in the instruction pipeline 104. OSC conflicts for instructions are determined at completion stage 105D based on information in the load queue 102 and the store queue 103; detection of an OSC conflict for an instruction triggers a flush and retry of the instruction, and possibly any other instructions that are younger than the instruction. The OSC history table 106 tracks information regarding instructions that have encountered OSC conflicts, and is updated after load instructions that have encountered OSC conflicts successfully complete. Processor 101 may comprise an out-of-order processor in some embodiments. Processor 101 may comprise a simultaneous multithreaded (SMT) processor in some embodiments. FIG. 1 is shown for illustrative purposes only; a computer system 100 may have any appropriate configuration and number of elements of various types.

Figure 2:
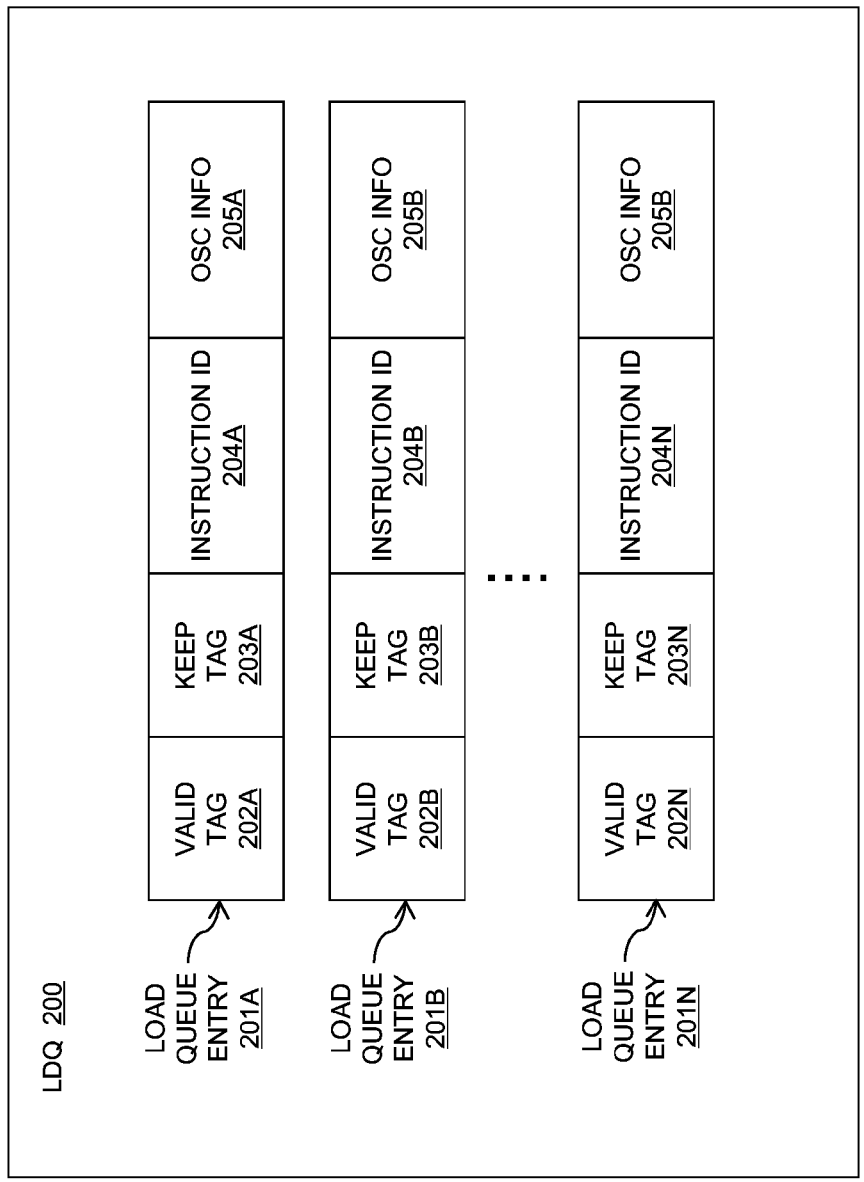
FIG. 2 depicts a load queue comprising a plurality of load queue entries in accordance with an embodiment.

FIG. 2 illustrates an embodiment of a load queue 200, which may correspond to load queue 102 of FIG. 1. Load queue 200 comprises a plurality of load queue entries 201A-N, each load queue entry corresponding to a load instruction. Each of load queue entries 201A-N comprises a respective valid tag 202A-N, keep tag 203A-N, instruction ID field 204A-N, and OSC information 205A-N. Each of valid tags 202A-N and keep tags 203A-N may comprise a single bit in some embodiment, that may either be set (e.g., 1) or unset (e.g., 0). Each Instruction ID field 204A-N may comprise a value that identifies the load instruction, for example, an ITag of the instruction. OSC information 205A-N is inserted into OSC history table 106 at completion of a load instruction that encountered an OSC conflict. FIG. 2 is shown for illustrative purposes only; a load queue such as load queue 200 may comprise any appropriate number of entries, and each entry may comprise any appropriate number of fields. Further, in various embodiments, a valid tag and/or a keep tag may be equal to 0 when set, and 1 when unset.

Figure 3:
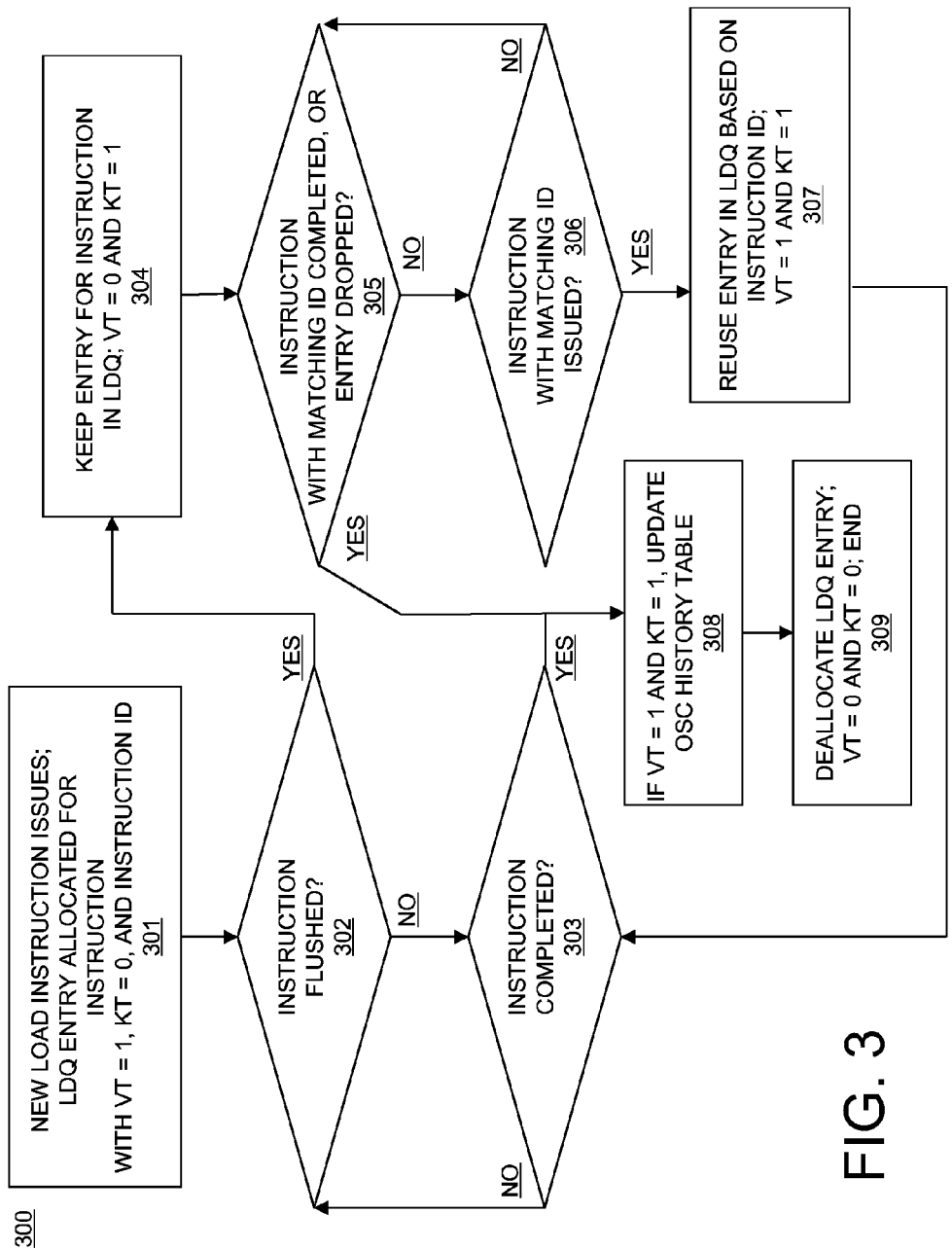
FIG. 3 depicts a process flow for load queue entry reuse for OSC history table update in accordance with an embodiment.

FIG. 3 illustrates an embodiment of a method 300 for load queue entry reuse for OSC history table update. FIG. 3 is discussed with respect to FIGS. 1 and 2. First, in block 301, a new load instruction is issued into instruction pipeline 104 in processor 101. A new load queue entry (for example, load queue entry 201A) is allocated in load queue 102/200 for the new instruction. In the newly allocated load queue entry 201A, valid tag 202A is set (e.g., 1), keep tag 203A is unset (e.g., 0), and the instruction ID field 204A may correspond to an ITag of the load instruction. An embodiment of block 301 is discussed in further detail below with respect to FIG. 4. Then flow proceeds from block 301 to block 302, in which it is determined whether the instruction is flushed due to, for example, an OSC conflict or an incorrect branch prediction. If the instruction is not flushed in block 303, flow proceeds to block 303, in which it is determined whether the instruction is successfully completed in completion stage 105D. If the instruction is not completed in block 303, flow returns to block 302, and blocks 302 and 303 repeat until the instruction is either flushed in block 302 or completed in block 303. If the instruction is completed in block 303, flow proceeds from block 303 to block 308, in which the OSC history table 106 is not updated for the instruction because the keep tag 203A is unset (e.g., 0). Flow then proceeds to block 309, in which the load queue entry 201A is decallocated, the valid tag and keep tag are both unset (e.g. 0), and method 300 ends.

If the instruction is flushed in block 302, flow proceeds from block 302 to block 304, in which the load queue entry 201A is preserved through the flush of the instruction. The valid tag 202A is unset (e.g., 0) and the keep tag 203A is set (e.g., 1) in block 304. Then, in block 305, it is determined whether another instruction that is not a load but that has the same ITag as instruction ID 204A has completed, or whether the load queue entry 201A has been dropped. If the load instruction was flushed in block 302 due to, for example, an incorrect branch prediction, the load instruction may not be reissued, and its ITag may be reassigned to another instruction. Also, if the load queue 102/200 is full, the load queue entry may be dropped based on its valid tag being unset and its keep tag being set if another load instruction needs to be added to the load queue; this is discussed in further detail with respect to FIG. 4. If, in block 305, another instruction that is not a load but that has the same ITag as instruction ID 204A has not completed, or the load queue entry 201A has not been dropped, flow proceeds from block 305 to block 306, in which it is determined whether a new load instruction having a same ITag as the flushed instruction (i.e., corresponding to instruction ID field 204A) has been reissued into pipeline 104. If a new load instruction having a same ITag has not been issued, flow returns from block 306 to block 305, and blocks 305 and 306 repeat until completion of another non-load instruction with the same ITag or dropping of the entry in block 305, or until a new instruction having a same ITag is been issued in block 306. If it is determined in block 305 that, another instruction that is not a load but that has the same ITag as instruction ID 204A has completed, or the load queue entry 201A has been dropped, flow proceeds to block 308, which is discussed below. If it is determined in block 306 that a new load instruction having a matching ITag has been issued, flow proceeds to block 307, in which the load queue entry 201A having the same ITag as the reissued instruction is reused for the reissued instruction. In block 307, the valid tag 202A is reset (e.g., 1) and the keep tag is left set (e.g., 1). Flow then proceeds from block 307 to block 303, in which it is determined whether the reissued instruction has completed. If the reissued instruction does not complete in block 303, flow may return to block 302, in which it is determined whether the reissued instruction has been flushed, as discussed above. If the reissued instruction does complete in block 303, flow proceeds from block 303 to block 308.

In block 308, it is determined whether the valid tag 202A and the keep tag 203A in the load queue entry 201A corresponding to the reissued instruction are both set (e.g., 1). If the valid tag 202A and keep tag 203A are both set, it is indicated that the execution of the reissued instruction was a successful completion of an instruction that was previously flushed due to an OSC conflict, and the OSC history table 106 is updated with OSC information 205A based on the reissued instruction. If the valid tag 202A is unset (e.g., 0) in 308, the instruction may have, for example, been dropped in block 305, and the OSC history table 106 does not need to be updated. Further, if the keep tag 203A is unset (e.g., 0) in block 305, the instruction may have proceeded through the pipeline without ever being flushed in block 302, and therefore did not have any OSC conflict, so the OSC history table 106 does not need to be updated. Lastly, flow proceeds from block 308 to block 309, in which the load queue entry 201A is deallocated and becomes a free entry, the valid tag 202A and the keep tag 203A are both unset (e.g., 0), and method 300 ends.

Figure 4:
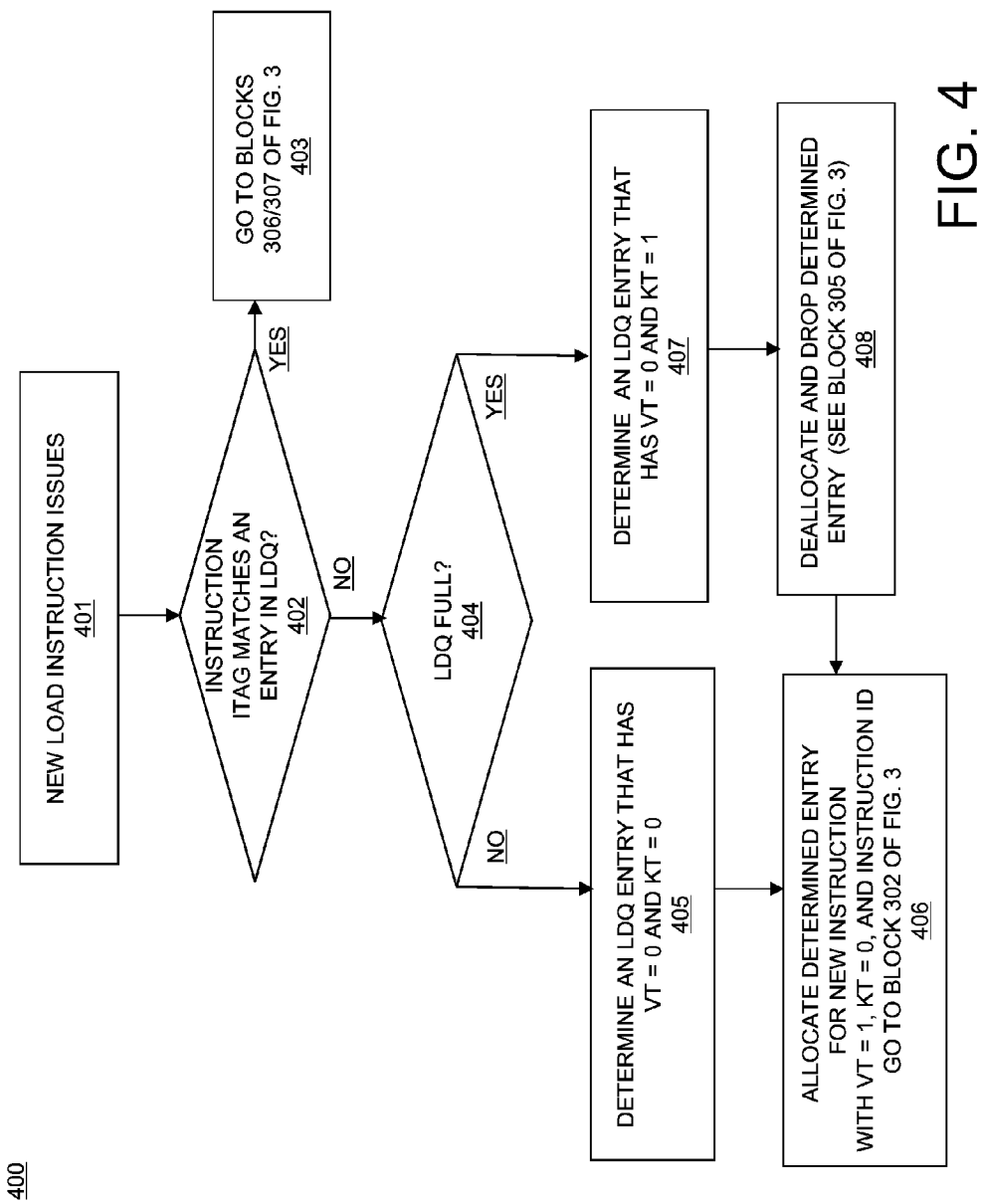
FIG. 4 depicts a process flow for allocating a load queue entry for a new load instruction in accordance with an embodiment.

FIG. 4 illustrates an embodiment of a method 400 for allocating a load queue entry for a newly issued load instruction as is performed in block 301 of FIG. 1. First, in block 401, a load instruction issued into pipeline 104. Then, in block 402, it is determined whether the issued instruction is a reissue of a load instruction that is already in the load queue 102/200. This is determined based on the ITag of the newly issued load instruction matching an ITag in an instruction ID field of instruction ID fields 204A-N in any load queue entry of load queue entries 201A-N. If it is determined that the issued instruction matches an entry that is already in the load queue 102/200 in block 402, flow proceeds to block 403, in which the instruction is handled as a flushed and reissued load instruction as described with respect to blocks 306/307 of FIG. 3. If it is determined in block 402 that the load instruction does not match any entry that is already in the load queue 102/200, flow proceeds from block 402 to block 404, in which it is determined whether the load queue 102/200 is full (i.e., there is no free load queue entry in which both the valid tag and the keep tag are unset in the load queue 102/200). If it is determined in block 404 that the load queue 102/200 is not full, flow proceeds to block 405, and a particular free load queue entry, i.e., an entry in which both the valid tag and the keep tag are unset (e.g., 0), is determined, and flow then proceeds to block 406, which is discussed below. If it is determined in block 404 that the load queue 102/200 is full, flow proceeds to block 407, and a particular load queue entry that is assigned to an instruction, and in which the valid tag is unset (e.g., 0) and the keep tag is set (e.g., 1) is determined. Such an entry corresponds to an instruction that has been flushed, and has not yet been reissued; for example, the instruction may correspond to an incorrect branch prediction. Flow then proceeds to block 408. In block 408, the particular load queue entry that was determined in block 407 is deallocated and dropped (as described with respect to block 305 of FIG. 3), such that the particular load queue entry becomes a free load queue entry. Then, flow proceeds from block 408 to block 406, in which the particular load queue entry (for example, load queue entry 201A) that was determined in either block 405 or blocks 407/408 is allocated to the instruction that was issued in block 401. In the newly allocated load queue entry 201A, valid tag 202A is set (e.g., 1), keep tag 203A is unset (e.g., 0), and the instruction ID field 204A is set equal to the ITag of the newly issued instruction. In some embodiments of block 407, there may be no entry in the load queue 102/200 that has the valid tag unset (e.g., 0) and the keep tag set (e.g., 1); in such an embodiment, the newly issued instruction is not entered into the load queue 102/200.

Technical effects and benefits include accurate update of OSC information in a computer processor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for load queue entry reuse for operand store compare (OSC) history table update, the method comprising:
    allocating a load queue entry in a load queue to a load instruction that is issued into an instruction pipeline of a processor, the load queue entry comprising a valid tag and a keep tag, wherein the valid tag is set and the keep tag is unset in the allocated load queue entry;
    flushing the load instruction by the instruction pipeline;
    based on the flushing of the load instruction, unsetting the valid tag and setting the keep tag in the allocated load queue entry;
    reissuing the load instruction into the instruction pipeline;
    determining that the allocated load queue entry corresponds to the reissued load instruction;
    based on determining that the allocated load queue entry corresponds to the reissued load instruction, setting the valid tag and leaving the keep tag set in the allocated load queue entry;
    completing the reissued load instruction in the instruction pipeline; and
    based on completing the reissued load instruction, and based on the valid tag and the keep tag being set, updating the OSC history table with OSC information corresponding to the load instruction.

2. The method of claim 1, wherein the load queue comprises a plurality of entries, each of the plurality of entries comprising a respective valid tag, a respective keep tag, and a respective instruction identifier.

3. The method of claim 2, wherein it is determined that the load queue entry corresponds to the reissued load instruction based on the instruction identifier of the load queue entry matching an instruction identifier of the reissued load instruction, and wherein the instruction identifier comprises an instruction tag (ITag).

4. The method of claim 1, further comprising, before allocating the load queue entry to the load instruction:
   determining whether the load queue is full; and
   based on determining that the load queue is full, identifying a load queue entry in which the valid tag is unset and the keep tag is set;
   deallocating the identified load queue entry by unsetting the keep tag in the identified load queue entry; and
   allocating the deallocated load queue entry to the load instruction.

5. the method of claim 4, further comprising, based on determining that the load queue is not full, identifying a load queue entry in which the valid tag is unset and the keep tag is unset; and
   allocating the identified load queue entry to the load instruction.

6. The method of claim 1, further comprising, based on the completion of the reissued load instruction, deallocating the identified load queue entry by unsetting the valid tag and keep tag in the load queue entry.

7. The method of claim 1, further comprising, based on completing a load instruction in the instruction pipeline that has not been flushed and reissued:
   determining that the keep tag of a load queue entry corresponding to the completed load instruction that has not been flushed and reissued is unset; and
   based on the keep tag being unset, not updating the OSC history table.

8. A computer program product for implementing load queue entry reuse for operand store compare (OSC) history table update, the computer program product comprising:
   a computer readable storage medium having program instructions embodied therewith, the program instructions readable by a processing circuit to cause the processing circuit to perform a method comprising:
   allocating a load queue entry in a load queue to a load instruction that is issued into an instruction pipeline of a processor, the load queue entry comprising a valid tag and a keep tag, wherein the valid tag is set and the keep tag is unset in the allocated load queue entry;
   flushing the load instruction by the instruction pipeline;
   based on the flushing of the load instruction, unsetting the valid tag and setting the keep tag in the allocated load queue entry;
   reissuing the load instruction into the instruction pipeline;
   determining that the allocated load queue entry corresponds to the reissued load instruction;
   based on determining that the allocated load queue entry corresponds to the reissued load instruction, setting the valid tag and leaving the keep tag set in the allocated load queue entry;
   completing the reissued load instruction in the instruction pipeline; and
   based on completing the reissued load instruction, and based on the valid tag and the keep tag being set, updating the OSC history table with OSC information corresponding to the load instruction.

9. The computer program product of claim 8, wherein the load queue comprises a plurality of entries, each of the plurality of entries comprising a respective valid tag, a respective keep tag, and a respective instruction identifier.

10. The computer program product of claim 9, wherein it is determined that the load queue entry corresponds to the reissued load instruction based on the instruction identifier of the load queue entry matching an instruction identifier of the reissued load instruction, and wherein the instruction identifier comprises an instruction tag (ITag).

11. The computer program product of claim 8, further comprising, before allocating the load queue entry to the load instruction:
   determining whether the load queue is full; and
   based on determining that the load queue is full, identifying a load queue entry in which the valid tag is unset and the keep tag is set;
   deallocating the identified load queue entry by unsetting the keep tag in the identified load queue entry; and
   allocating the deallocated load queue entry to the load instruction.

12. the computer program product of claim 11, further comprising, based on determining that the load queue is not full, identifying a load queue entry in which the valid tag is unset and the keep tag is unset; and
   allocating the identified load queue entry to the load instruction.

13. The computer program product of claim 8, further comprising, based on the completion of the reissued load instruction, deallocating the identified load queue entry by unsetting the valid tag and keep tag in the load queue entry.

14. The computer program product of claim 8, further comprising, based on completing a load instruction in the instruction pipeline that has not been flushed and reissued:
   determining that the keep tag of a load queue entry corresponding to the completed load instruction that has not been flushed and reissued is unset; and
   based on the keep tag being unset, not updating the OSC history table.

15. A computer system for load queue entry reuse for operand store compare (OSC) history table update, the system comprising:
   a memory; and
   a processor, communicatively coupled to said memory, the computer system configured to perform a method comprising:
   allocating a load queue entry in a load queue to a load instruction that is issued into an instruction pipeline of a processor, the load queue entry comprising a valid tag and a keep tag, wherein the valid tag is set and the keep tag is unset in the allocated load queue entry;
   flushing the load instruction by the instruction pipeline;
   based on the flushing of the load instruction, unsetting the valid tag and setting the keep tag in the allocated load queue entry;
   reissuing the load instruction into the instruction pipeline;
   determining that the allocated load queue entry corresponds to the reissued load instruction;
   based on determining that the allocated load queue entry corresponds to the reissued load instruction, setting the valid tag and leaving the keep tag set in the allocated load queue entry;
   completing the reissued load instruction in the instruction pipeline; and
   based on completing the reissued load instruction, and based on the valid tag and the keep tag being set, updating the OSC history table with OSC information corresponding to the load instruction.

16. The system of claim 15, wherein the load queue comprises a plurality of entries, each of the plurality of entries comprising a respective valid tag, a respective keep tag, and a respective instruction identifier.

17. The system of claim 16, wherein it is determined that the load queue entry corresponds to the reissued load instruction based on the instruction identifier of the load queue entry matching an instruction identifier of the reissued load instruction, and wherein the instruction identifier comprises an instruction tag (ITag).

18. The system of claim 15, further comprising, before allocating the load queue entry to the load instruction:
- determining whether the load queue is full; and
- based on determining that the load queue is full, identifying a load queue entry in which the valid tag is unset and the keep tag is set;
- deallocating the identified load queue entry by unsetting the keep tag in the identified load queue entry; and
- allocating the deallocated load queue entry to the load instruction.

19. the system of claim 18, further comprising, based on determining that the load queue is not full, identifying a load queue entry in which the valid tag is unset and the keep tag is unset; and
- allocating the identified load queue entry to the load instruction.

20. The system of claim 15, further comprising, based on the completion of the reissued load instruction, deallocating the identified load queue entry by unsetting the valid tag and keep tag in the load queue entry.

\* \* \* \* \*